US011731768B2

(12) United States Patent
Bruno et al.

(10) Patent No.: US 11,731,768 B2
(45) Date of Patent: Aug. 22, 2023

(54) USING BLEED AIR TO SUPPLY OUTSIDE AIR TO A CABIN

(71) Applicant: Hamilton Sundstrand Corporation, Charlotte, NC (US)

(72) Inventors: Louis J. Bruno, Ellington, CT (US); Tony Ho, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/836,477

(22) Filed: Jun. 9, 2022

(65) Prior Publication Data

US 2022/0315226 A1    Oct. 6, 2022

Related U.S. Application Data

(62) Division of application No. 16/437,405, filed on Jun. 11, 2019, now Pat. No. 11,377,217.

(51) Int. Cl.
*B64D 13/06*    (2006.01)
*F25B 11/00*    (2006.01)

(52) U.S. Cl.
CPC ............. *B64D 13/06* (2013.01); *F25B 11/00* (2013.01); *B64D 2013/064* (2013.01); *B64D 2013/0611* (2013.01); *B64D 2013/0618* (2013.01); *B64D 2013/0662* (2013.01)

(58) Field of Classification Search
CPC ............ B64D 13/06; B64D 2013/0611; B64D 2013/0618; B64D 2013/064; B64D 2013/0662; F25B 11/00
See application file for complete search history.

(56) References Cited

U.S. PATENT DOCUMENTS

| 5,299,763 | A  | 4/1994  | Bescoby et al. |
| 5,461,882 | A  | 10/1995 | Zywiak |
| 7,467,524 | B2 | 12/2008 | Brutscher et al. |
| 9,657,648 | B2 | 5/2017  | Bruno |

(Continued)

FOREIGN PATENT DOCUMENTS

| EP | 0888966 A2 | 1/1999 |
| EP | 3354574 A1 | 8/2018 |
| EP | 3480113 A1 | 5/2019 |

OTHER PUBLICATIONS

European Office Action; European Application No. 19216158.6; dated May 19, 2022; 6 pages.

(Continued)

*Primary Examiner* — Joseph F Trpisovsky
(74) *Attorney, Agent, or Firm* — Cantor Colburn LLP

(57) ABSTRACT

A method of operating an environmental control system of an aircraft includes providing a first medium to the environmental control system including a compressor and a turbine, wherein the first medium is provided to the compressor and the turbine sequentially and extracting work from a second medium provided to a power turbine operably coupled to the compressor to drive the compressor. In a first mode of operation, the first medium to be provided to a downstream load is output from the turbine, in a second mode of operation, at least a portion of the first medium to be provided to a downstream load bypasses the turbine, and in a third mode of operation, at least a portion of the first medium output from the compressor is provided to the power turbine.

8 Claims, 6 Drawing Sheets

(56) References Cited

U.S. PATENT DOCUMENTS

| | | |
|---|---|---|
| 9,669,936 B1 | 6/2017 | Fiterman et al. |
| 10,059,458 B2 | 8/2018 | Squier |
| 10,144,517 B2 | 12/2018 | Bruno et al. |
| 2004/0195447 A1 | 10/2004 | Claeys |
| 2006/0059942 A1 | 3/2006 | McAulife et al. |
| 2013/0316633 A1 | 11/2013 | Kim et al. |
| 2015/0166187 A1* | 6/2015 | Durbin .................. B64D 13/08 62/402 |
| 2015/0314877 A1 | 11/2015 | McAuliffe et al. |
| 2017/0341759 A1 | 11/2017 | Bruno et al. |
| 2017/0341760 A1 | 11/2017 | Hall et al. |
| 2017/0341764 A1 | 11/2017 | Bruno et al. |
| 2017/0342838 A1 | 11/2017 | Bruno et al. |
| 2018/0111693 A1 | 4/2018 | Shea |
| 2018/0215474 A1 | 8/2018 | Defrancesco et al. |
| 2018/0237144 A1 | 8/2018 | Bruno et al. |
| 2019/0135440 A1 | 5/2019 | Bruno et al. |
| 2019/0135441 A1 | 5/2019 | Bruno et al. |
| 2020/0391870 A1 | 12/2020 | Bruno et al. |
| 2020/0391872 A1 | 12/2020 | Bruno et al. |

OTHER PUBLICATIONS

European Office Action; European Application No. 9216224.6; dated Feb. 16, 2022; 4 pages.

Extended European Search Report; International Application No. 19216158.6-1010; International Filing Date Dec. 13, 2019; dated Jul. 16, 2020; 52 pages.

Extended European Search Report; International Application No. 19216224.6-1010; International Filing Date Dec. 13, 2019; dated Jul. 20, 2020; 8 pages.

U.S. Appl. No. 16/437,394; filed Jun. 11, 2019; Non Final Office Action; dated Jul. 20, 2021; 32 pages.

U.S. Appl. No. 17/731,970; filed Apr. 28, 2022; Non Final Office Action; dated Nov. 30, 2022; 17 pages.

\* cited by examiner

USING BLEED AIR TO SUPPLY OUTSIDE AIR TO A CABIN

CROSS-REFERENCE TO RELATED APPLICATIONS

This application is a division of U.S. application Ser. No. 16/437,405 filed Jun. 11, 2019, the disclosure of which is incorporated herein by reference in its entirety.

BACKGROUND

Embodiments of the disclosure relate to environmental control systems, and more specifically to an environmental control system of an aircraft.

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin. Unfortunately, each of these approaches provides limited efficiency with respect to engine fuel burn.

Early air conditioning systems commonly used on an aircraft, were typically driven by pressurized air suppled from a turbo compressor. High pressure air drawn from an engine is delivered to a turbo compressor to compress outside air within the turbo compressor. The compressed outside air output from turbo compressor then passes through a series of heat exchangers, an air cycle machine, and a high pressure water separator where the air is cooled and dehumidified. The resulting cool dry air is provided to the cabin, flight deck, and one or more other systems of the aircraft.

BRIEF DESCRIPTION

According to one embodiment, an environmental control system of an aircraft includes a compressing device including a compressor and a turbine configured to receive a flow of first medium sequentially and a second turbine arranged in fluid communication with an outlet of the compressor. The second turbine is configured to receive a flow of second medium distinct from the first medium. A dehumidification system is arranged in fluid communication with the turbine, a first bypass valve is configured to divert at least a portion of the flow of the first medium output from the compressor around the turbine, and a second bypass valve configured to divert at least a portion of the flow of first medium output from the compressor to the second turbine.

In addition to one or more of the features described above, or as an alternative, in further embodiments the second medium is provided from a bleed air source including at least one of an engine and an auxiliary power unit of the aircraft.

In addition to one or more of the features described above, or as an alternative, in further embodiments the first medium is fresh outside air.

In addition to one or more of the features described above, or as an alternative, in further embodiments the second medium output from the power turbine is exhausted overboard.

In addition to one or more of the features described above, or as an alternative, in further embodiments comprising a ram air circuit, wherein the second medium output from the power turbine is provided to the ram air circuit.

In addition to one or more of the features described above, or as an alternative, in further embodiments the power turbine is a dual entry turbine operable to receive the flow of first medium output from the compressor and the flow of second medium simultaneously.

In addition to one or more of the features described above, or as an alternative, in further embodiments the power turbine includes a first inlet and a second inlet, the flow of first medium output from the compressor being provided to the first inlet and the flow of second medium being provided to the second inlet.

In addition to one or more of the features described above, or as an alternative, in further embodiments comprising a ram air circuit including a ram air duct having at least one heat exchanger positioned therein.

In addition to one or more of the features described above, or as an alternative, in further embodiments the at least one heat exchanger is configured to receive the flow of medium output from the compressor.

In addition to one or more of the features described above, or as an alternative, in further embodiments the at least one heat exchanger includes a first heat exchanger and a second heat exchanger, the first heat exchanger is configured to receive the flow of medium output from the compressor, and the second heat exchanger is configured to receive the flow of second medium.

In addition to one or more of the features described above, or as an alternative, in further embodiments the second heat exchanger is positioned upstream from the power turbine relative to the flow of second medium.

In addition to one or more of the features described above, or as an alternative, in further embodiments the environmental control system is operable in a plurality of modes including a first mode and a second mode.

In addition to one or more of the features described above, or as an alternative, in further embodiments the environmental control system is operable in the first mode when an ambient temperature is at or above a design point of the environmental control system.

In addition to one or more of the features described above, or as an alternative, in further embodiments the environmental control system is operable in the second mode when an ambient temperature is below a design point of the environmental control system.

In addition to one or more of the features described above, or as an alternative, in further embodiments the bypass valve is in a closed position during operation in the first mode and the bypass valve is in an open position during operation in the second mode.

According to another embodiment, a method of operating an environmental control system of an aircraft includes providing a first medium to the environmental control system including a compressor and a turbine, wherein the first medium is provided to the compressor and the turbine sequentially and extracting work from a second medium provided to a power turbine operably coupled to the compressor to drive the compressor. In a first mode of operation, the first medium to be provided to a downstream load is output from the turbine, in a second mode of operation, at least a portion of the first medium to be provided to a downstream load bypasses the turbine, and in a third mode of operation, at least a portion of the first medium output from the compressor is provided to the power turbine.

In addition to one or more of the features described above, or as an alternative, in further embodiments the environmental control system is transformed from the first mode of operation to the second mode of operation by opening a first bypass valve.

In addition to one or more of the features described above, or as an alternative, in further embodiments the environmental control system is transformed from the first mode of operation to the third mode of operation by opening a second bypass valve.

In addition to one or more of the features described above, or as an alternative, in further embodiments in the third mode of operation, the first medium and the second medium are provided to the power turbine simultaneously.

In addition to one or more of the features described above, or as an alternative, in further embodiments providing the second medium to the environmental control system includes drawing bleed air from an engine of the aircraft.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Embodiments herein provide an environmental control system of an aircraft that receives multiple mediums from different sources and uses energy from one or more of the mediums to operate the environmental control system and to provide cabin pressurization and cooling at a high fuel burn efficiency. The mediums described herein are generally types of air; however, it should be understood that other mediums, such as gases, liquids, fluidized solids, or slurries are also contemplated herein.

Figure 1:
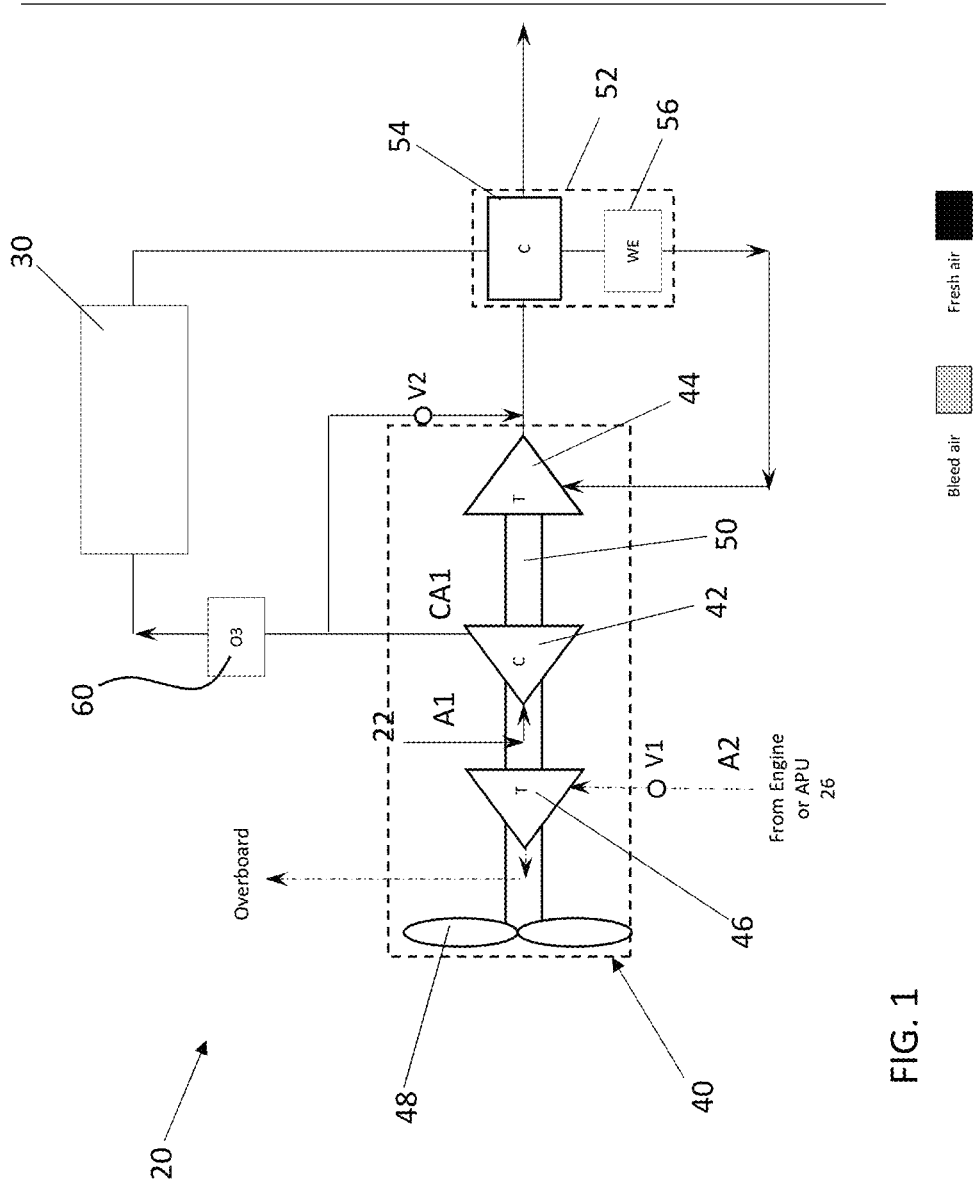
FIG. 1 is a schematic diagram of an environmental control system according to an embodiment.

With reference now to FIG. 1, a schematic diagram of an environment control system (ECS) 20 is depicted according to a non-limiting embodiment. Although the environmental control system 20 is described with reference to an aircraft, alternative applications are also within the scope of the disclosure. As shown in the FIG., the system 20 can receive a first medium A1 at a first inlet 22 and provide a conditioned form of the first medium A1 to a volume 24. In embodiments where the environmental control system 20 is used in an aircraft application, the first medium A1 is fresh or outside ambient air.

The system 20 receives a second medium A2 at an inlet 26. In one embodiment, the second medium A2 is bleed air. As used herein, the term "bleed air" includes pressurized air originating from i.e. being "bled" from, an engine or auxiliary power unit of the aircraft. It shall be understood that one or more of the temperature, humidity, and pressure of the bleed air may vary based upon the compressor stage and revolutions per minute of the engine or auxiliary power unit from which the air is drawn. For example, bleed air may be drawn from either a low pressure compressor spool or a high pressure compressor spool of an engine, and bleed air drawn from the low pressure compressor spool will have a relatively lower pressure than bleed air drawn from the high pressure compressor spool. In some embodiments, the system 20 is configured to extract work from the second medium A2. In this manner, the pressurized air A2 can be utilized by the system 20 to achieve certain operations.

The environmental control system 20 includes one or more heat exchangers. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers. In an embodiment, the one or more heat exchangers may be located within the shell of a RAM air circuit (not shown), such that the one or more heat exchangers may be referred to as "ram heat exchangers." Within the one or more heat exchangers, a cooling fluid, such as outside air drawn in through a scoop for example, acts as a heat sink to cool a medium passing there through, for example the first medium A1 and/or the second medium A2. In an embodiment, best shown in FIG. 1, the one or more heat exchangers includes a first heat exchanger 30. In another embodiment, the one or more heat exchangers includes the first heat exchanger 30 and a second heat exchanger 32. The heat exchangers 30, 32 may be arranged in series relative to the flow of cooling medium.

The system 20 additionally comprises at least one compressing device 40. In the illustrated, non-limiting embodiment, the compressing device 40 of the system 20 is a mechanical device that includes components for performing thermodynamic work on a medium (e.g., extracts work from or applies work to the first medium A1 and/or the second medium A2 by raising and/or lowering pressure and by raising and/or lowering temperature.) Examples of the compressing device 40 include an air cycle machine, a three-wheel air cycle machine, a four-wheel air cycle machine, etc.

As shown, the compressing device 40 includes a compressor 42, a turbine 44, and a power turbine 46, operably coupled to each other via a shaft 50 that is also is connected to a fan 48. The compressor 42 is a mechanical device that raises a pressure of a medium provided thereto and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the second medium A2.

Figure 2:
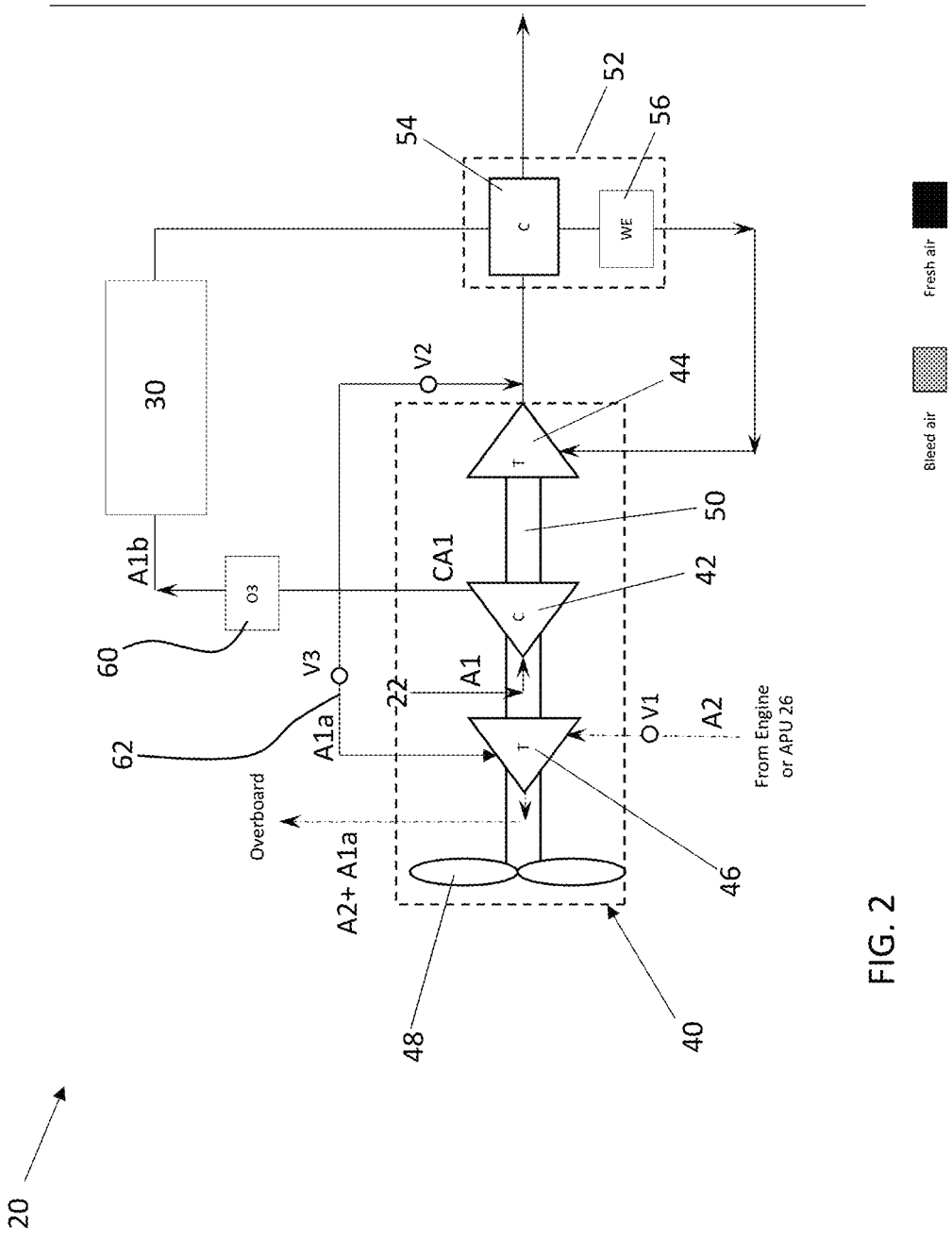
FIG. 2 is a schematic diagram of an environmental control system according to an embodiment.

Each of the turbine 44 and the power turbine 46 is a mechanical device that expands a medium and extracts work therefrom (also referred to as extracting energy). In the compressing device 40, the power turbine 46 drives the compressor 42 and the fan 48 via the shaft 50. In an embodiment, best shown in FIGS. 1 and 3, a single flow of a medium, such as the second medium A2 for example, is provided to the power turbine 46. However, in other embodiments, as shown in FIGS. 2 and 4, the power turbine 46 can be a dual entry turbine that includes multiple inlet fluid flow paths, such as an inner flow path and an outer flow path, to enable mixing of alternative medium flows within the turbine or at the exit of the power turbine 46. In an embodiment, the inner flow path is a first diameter and the outer flow path is a second diameter. Further, the power turbine 46 may include a first nozzle configured to accelerate the first medium for entry into a turbine impeller and a second nozzle configured to accelerate the second medium for entry into the turbine impeller. The turbine impeller can be configured with a first gas path configured to receive the first medium from the first nozzle and with a second gas path configured to receive the second medium from the second nozzle.

The fan 48 is a mechanical device that can force, via push or pull methods, a medium (e.g., ram air) across the one or more heat exchangers 30 and at a variable cooling to control temperatures.

The system 20 additionally includes at least one dehumidification system 52. In the illustrated, non-limiting embodiment, the dehumidification system 52 includes a condenser 54 and a water extractor 56. The condenser 54 is a particular type of heat exchanger and the water extractor 56 is a mechanical device that removes water from a medium. The condenser 54 and the water extractor 56 are arranged to receive the first medium A1, and in some embodiments, both the first medium A1 and the second medium A2. The configuration of the at least one dehumidification system 52 may vary. It should be understood that the disclosed configuration of the dehumidification system is intended as an example only, and embodiments including one or more additional components are also within the scope of the disclosure.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system can be regulated to a desired value. For instance, a first valve V1 is configured to control a supply of the second medium A2 provided to the system 20. A second valve V2 may be operable to allow a portion of a medium, such as the first medium A1, to bypass the turbine 44 of the compression device 40. As a result, operation of the second valve V2 may be used to add heat and to drive the compression device 40 during failure modes. In embodiments where the power turbine 46 is a dual entry turbine, a third valve V3 may be similarly operable to control a supply of the first medium output from the compressor 42 to the power turbine 46 as is illustrated in FIGS. 2 and 4.

The environmental control system of FIG. 1 may be operable in a plurality of modes based on a flight condition of the aircraft. For example, the environmental control system 20 may be operable in a first mode when the ambient temperature is at or above a selected design point of the system 20. In the first mode of operation, valve V1 is opened to draw a high pressure, hot second medium A2, such as bleed air, from a bleed source, such as the turbine engine or the auxiliary power unit. This second medium A2 then enters the power turbine 46, such as via a nozzle. The high pressure, high temperature second medium A2 is expanded across the power turbine 46 and work extracted from the hot high pressure air. This extracted work drives the compressor 42 via shaft 50. This extracted work also drives the fan 48, which is used to move air through the heat exchanger 30, via a ram air duct (not shown). The second medium output from the power turbine 46 may be exhausted overboard, into the ambient atmosphere At the same time, a flow of cool, low pressure first medium A1, such as fresh outside air for example, is provided to an inlet of the compressor 42. The act of compressing the fresh outside air, heats the fresh outside air. The compressed first medium A1 provided at the outlet of the compressor 42 (shown as CA1) then passes through an ozone converter 60 before being provided to the heat exchanger 30. Within the heat exchanger 30, the compressed first medium CA1 is cooled via a flow of ram air. Embodiments where other components, such as an outflow heat exchanger (not shown) for example, are positioned directly downstream from or upstream from the heat exchanger 30 are also within the scope of the disclosure.

The warm first medium A1 is then provided to at least a portion of the dehumidification system 52. As shown, the first medium A1 output from the heat exchanger 30 is provided sequentially to the condenser 54 and water extractor 56 of the dehumidification system 52 where any free moisture within the first medium A1 is condensed and removed, to produce cool high-pressure air. This cool, high pressure first medium A1 then enters the turbine 44 through an inlet or nozzle.

The cool, high pressure first medium A1 is expanded across the turbine 44 and work is extracted therefrom. In combination with the work resulting from the power turbine 46, this extracted work drives the compressor 42 and the fan 48, as previously described. The cold, for example freezing, first medium A1 output from the turbine 44 enters the condenser 54 to cool the warm first medium A1 leaving the heat exchanger 30. The first medium A1 is then sent to one or more downstream loads and/or locations of the aircraft. In an embodiment, the first medium A1 output from the turbine 44 and the condenser 54 is mixed with another medium (not shown), such as recirculated air for example, such as provided from the volume 22. The mixture of conditioned fresh air and recirculated air may then be used to condition the volume 22, such as the cabin and flight deck of an aircraft for example.

With continued reference to FIG. 1, the second mode of the environmental control system 20 is associated with operation of the system 20 at ambient temperatures below a selected design point of the environmental control system. In the second mode of operation, the bypass valve V2 is open, thereby allowing at least a portion of the first medium A1 output from the compressor 42 to bypass the heat exchanger 30, the first pass through the condenser 54, the water extractor 56, and the turbine 44. In such embodiments, at least a portion of the first medium A1 output from the compressor 42 is provided downstream from an outlet of the turbine 44, before being provided to the condenser 54 and then delivered to one or more downstream loads, such as to condition the volume 22.

The environmental control system 20 of FIG. 2 operates similarly to the environmental control system 20 of FIG. 1, except that in the illustrated, non-limiting embodiment, the power turbine 46 is a dual entry turbine. Accordingly, an additional conduit 62 connects the outlet of the compressor 42 to a second inlet or nozzle of the power turbine 46. A valve V3 is operable to selectively control a flow of the first medium A1 output from the compressor to the power turbine 46.

During operation of the system of FIG. 2 in a first mode, when the ambient temperature is at or above a selected design point of the system 20, valve V3 is at least partially open. Accordingly, the hot, medium pressure fresh air output from the compressor 42 is split into a first portion, A1a and a second portion A1b. The first portion of the first medium output from the compressor 42 is provided to power turbine 46 via the conduit 62, and work is extracted therefrom. The first portion A1a of the first medium and the second medium exhausted from the power turbine 46 may be dumped overboard, or alternatively, into the ram air circuit. The second portion A1b of the first medium A1 output from the compressor 42 is provided to the ozone converter 60, the heat exchanger 30, and the remainder of the components of the system 20 as previously described with respect to FIG. 1.

Figure 3:
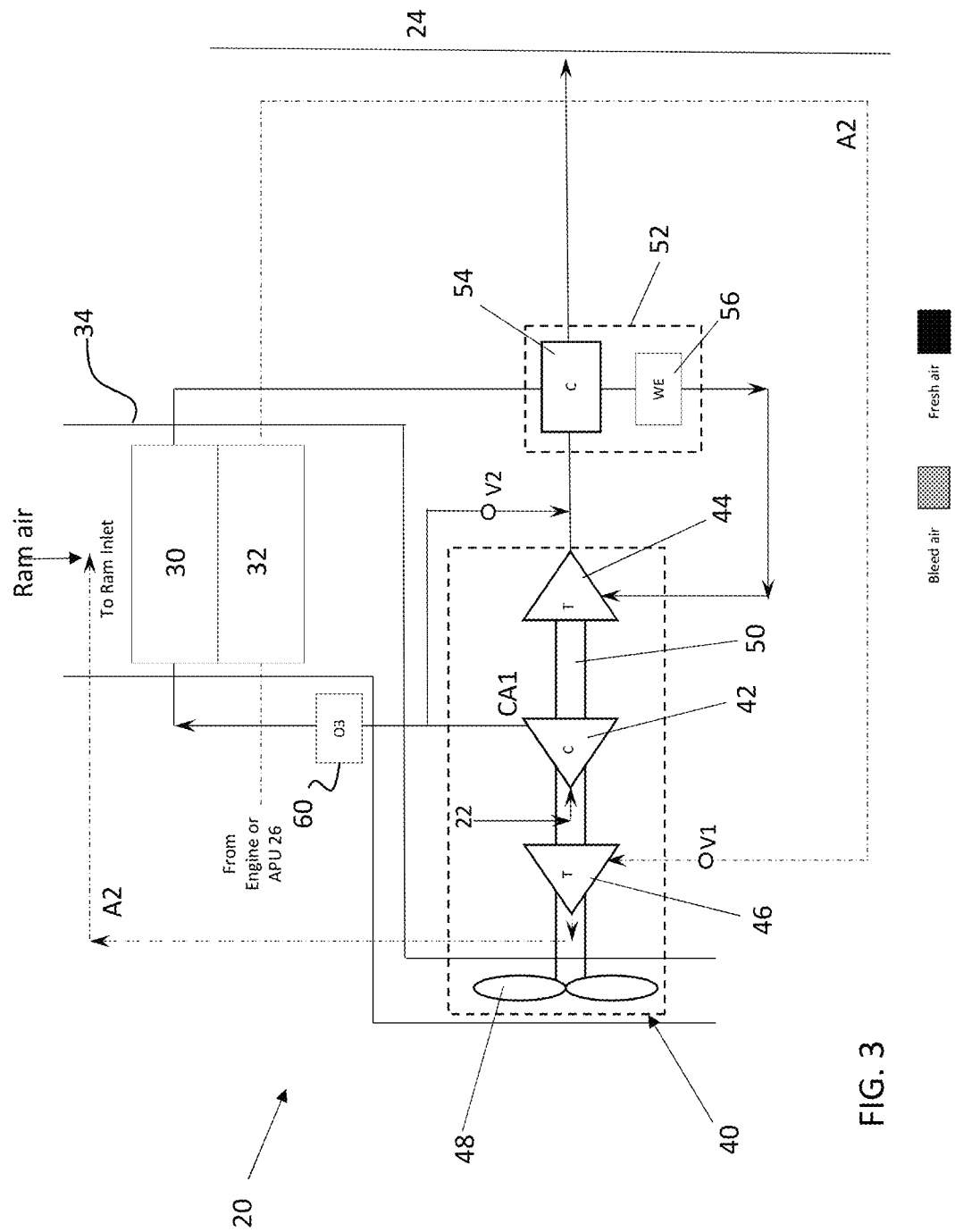
FIG. 3 is a schematic diagram of an environmental control system according to another embodiment.
Figure 4:
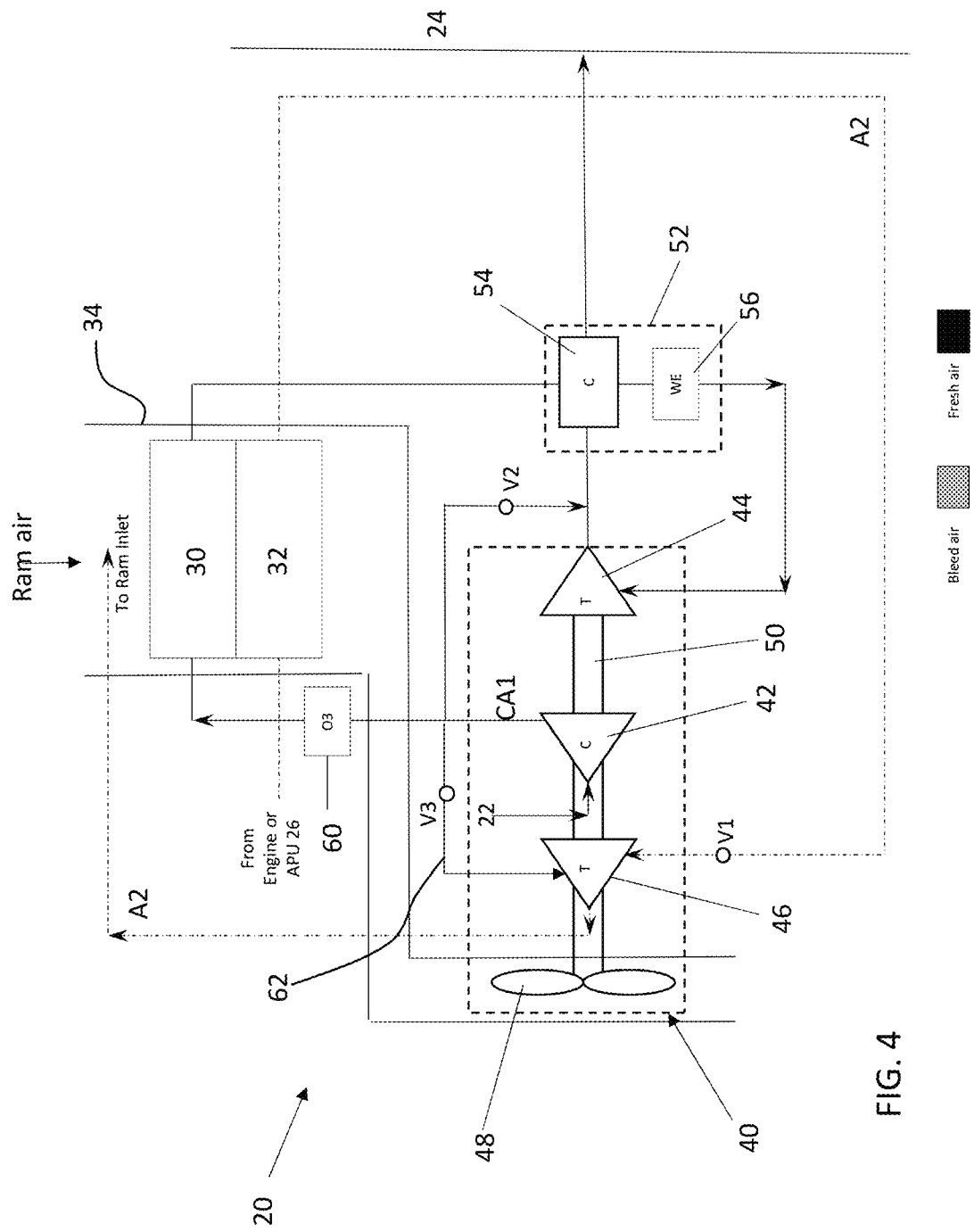
FIG. 4 is a schematic diagram of an environmental control system according to yet another embodiment.

With reference now to FIG. 3, the illustrated environmental control system 20 is similar to the system of FIG. 1. However, in the embodiment illustrated in FIG. 3, the system 20 additionally includes a second heat exchanger 32 arranged downstream from the first heat exchanger 30 relative to a flow of ram air within a ram air circuit defined by a ram air shell 34. In a first mode of operation, valve V1 is open and a high pressure, high temperature second medium A2, such as bleed air, is configured to pass through the second heat exchanger 32 before being provided to power turbine 46. Within the second heat exchanger, the high pressure, high temperature second medium A2 is cooled via a heat exchange relationship with the ram air flow. With the power turbine 46, the high pressure, warm temperature second medium A2 is expanded across the power turbine 46 and work extracted therefore. This work drives the compressor 42 and the fan 48 via shaft 50. Operation of the fan 48 moves air through the ram air circuit, across the heat exchangers 30, 32. The second medium A2 output from the power turbine 46 may be exhausted overboard, into the ambient atmosphere, or alternatively, may be dumped into the ram air circuit, for example upstream from one or both of the heat exchangers 30, 32.

At the same time, a flow of cool, low pressure first medium A1, such as fresh outside air for example, is provided to an inlet of the compressor 42. The act of compressing the fresh outside air, heats the fresh outside air. The compressed first medium A1 provided at the outlet of the compressor 42 may then pass through an ozone converter 60 before being provided to the first heat exchanger 30. Within the heat exchanger 30, the first medium A1 is cooled via the flow of ram air.

The warm, moist first medium A1 is then provided to at least a portion of the dehumidification system 52. As shown, the first medium A1 output from the first heat exchanger 30 is provided sequentially to the condenser 54 and water extractor 56 of the dehumidification system 52 where any free moisture within the first medium A1 is condensed and removed, to produce cool high-pressure air. This cool, high pressure first medium A1 then enters the turbine 44 through an inlet or nozzle.

The cool, high pressure first medium A1 is expanded across the turbine 44 and work is extracted therefrom. In combination with the work resulting from the power turbine 46, this extracted work drives the compressor 42 and the fan 48, as previously described. The cold, for example freezing, first medium A1 output from the turbine 44 enters the condenser 52 to cool the warm first medium A1 leaving the heat exchanger 30. The first medium A1 is then sent to one or more downstream loads and/or locations of the aircraft. As previously described, in an embodiment, the first medium A1 output from the turbine 44 and the condenser 54 is mixed with another medium, such as recirculated air, such as provided from the volume 22 for example. The mixture of conditioned fresh air A1 and recirculated air (not shown) may then be used to condition the volume 22, such as the cabin and flight deck of the aircraft for example.

With continued reference to FIG. 3, a second mode of the environmental control system 20 may be associated with operation at ambient temperatures below a selected design point of the environmental control system 20. In the second mode of operation, the bypass valve V2 is open, thereby allowing at least a portion of the first medium A1 output from the compressor 42 to bypass the first heat exchanger 30, a first pass through the condenser 54, the water extractor 56, and the turbine 44. In such embodiments, at least a portion of the first medium A1 output from the compressor 42 is provided downstream from an outlet of the turbine 44, before being provided to the condenser 54 and then delivered to one or more downstream loads, such as to condition the volume 22.

The environmental control system 20 of FIG. 4 is substantially identical to the environmental control system 20 of FIG. 3, except that in the illustrated, non-limiting embodiment, the power turbine 46 is a dual entry turbine. Accordingly, an additional conduit 62 connects the outlet of the compressor 42 to a second inlet or nozzle of the power turbine 46. A valve V3 is operable to selectively control a flow of the first medium A1 output from the compressor to the power turbine 46.

During operation of the system of FIG. 4 in a first mode, when the ambient temperature is at or above a selected design point of the system 20, valve V3 is at least partially open. Accordingly, the hot, medium pressure fresh air A1 output from the compressor 42 is split into a first portion A1a and a second portion A1b. The first portion A1a of the first medium A1 output from the compressor 42 is provided to power turbine 46 via the conduit 62, and work is extracted therefrom. The first portion A1a of the first medium and the second medium A2 exhausted from the power turbine 46 may be dumped overboard, or alternatively, into the ram air circuit as shown. The second portion A1b of the first medium A1 output from the compressor 42 is provided to the ozone converter 60, the heat exchanger 30, and the remainder of the components of the system 20 as previously described with respect to FIGS. 1-3.

Figure 5:
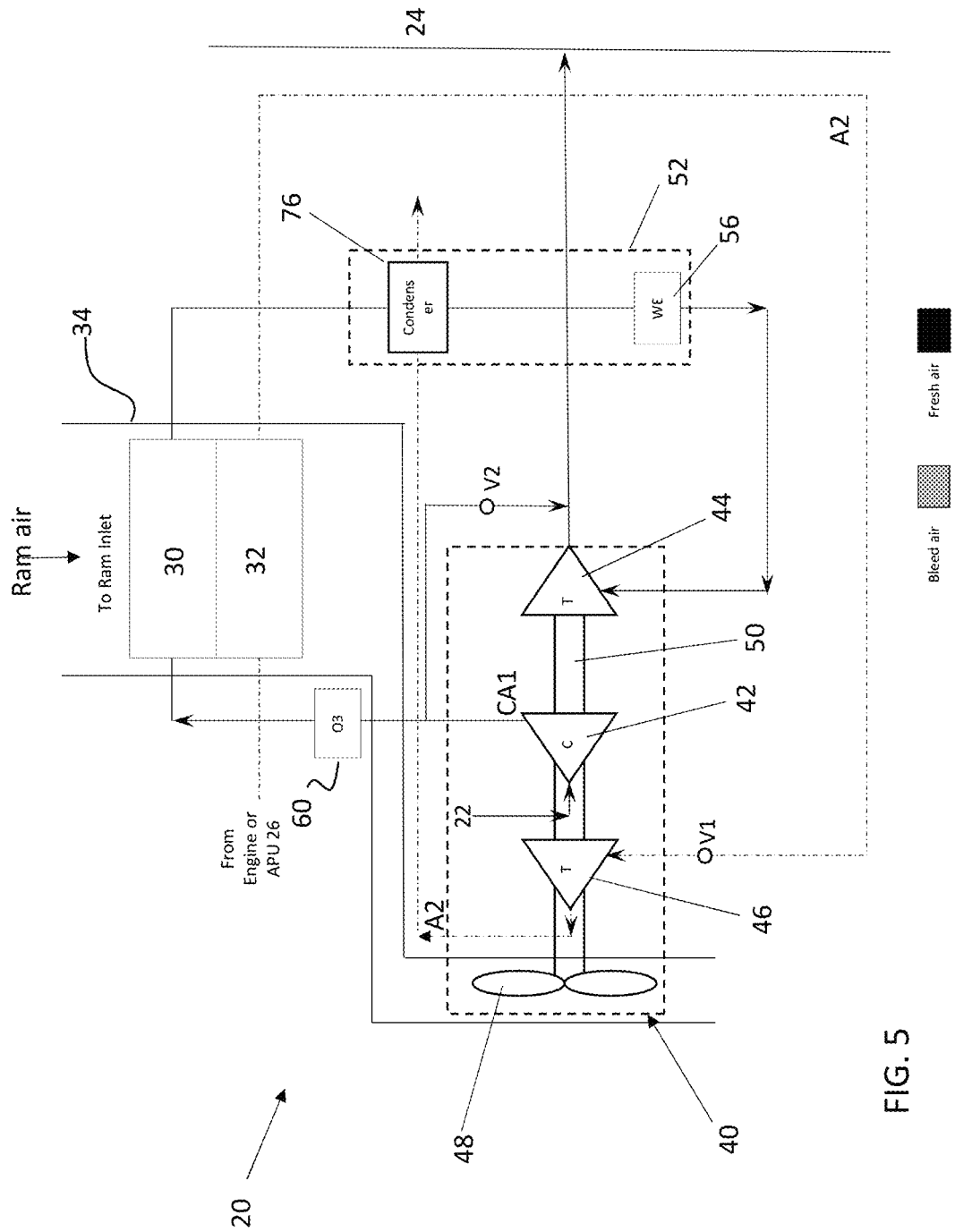
FIG. 5 is a schematic diagram of an environmental control system according to yet another embodiment.
Figure 6:
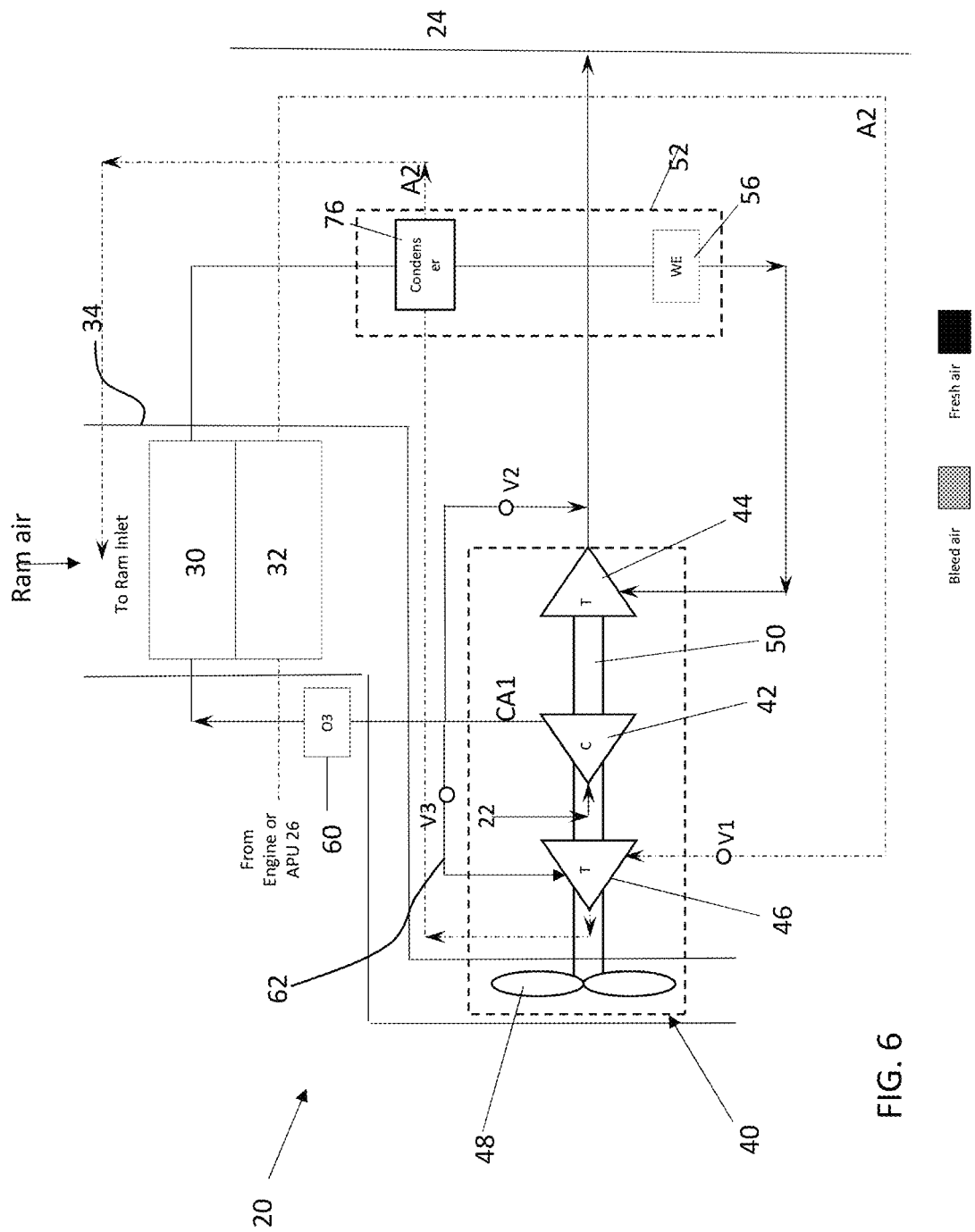
FIG. 6 is a schematic diagram of an environmental control system according to yet another embodiment.

The systems illustrated in FIGS. 5 and 6, are similar to the systems of FIGS. 3 and 4, respectively. Although the condenser 54 is operable to cool the flow of first medium A1 such that the water therein may be removed from the flow in the water extractor 56, in the systems shown in FIGS. 5 and 6, the condenser 54 of the dehumidification system 52 is no longer arranged in fluid communication with the outlet of the turbine 44. Rather, the condenser 54 is configured to receive fluid from the outlet of the power turbine 46. By positioning the condenser in fluid communication with the power turbine 46, the flow of second medium A2 used to cool the first medium A1 within the condenser is at a temperature above freezing. As a result, the potential for the formation of ice within the condenser 54 is generally reduced. In addition, the pressure of the air provided to the volume 24 will remain generally equal to the pressure of the air output from the turbine 44. After passing through this condenser 54, the second medium A2 may be exhausted overboard, or alternatively, into the ram air circuit, upstream from the ram air heat exchangers 30, 32.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. A method of operating an environmental control system of an aircraft comprising:
    providing a first medium to the environmental control system including a compressor and a turbine, wherein the first medium is provided to the compressor and the turbine sequentially; and
    extracting work from a second medium provided to a power turbine operably coupled to the compressor to drive the compressor;
    wherein in a first mode of operation, the first medium to be provided to a downstream load is output from the turbine, in a second mode of operation, at least a portion of the first medium to be provided to a downstream load bypasses the turbine, and in a third mode of operation, at least a portion of the first medium output from the compressor is provided to the power turbine.

2. The method of claim 1, wherein the environmental control system is transformed from the first mode of operation to the second mode of operation by opening a first bypass valve.

3. The method of claim 2, wherein the environmental control system is transformed from the first mode of operation to the third mode of operation by opening a second bypass valve.

4. The method of claim 2, wherein in the third mode of operation, the first medium and the second medium are provided to the power turbine simultaneously.

5. The method of claim 1, wherein providing the second medium to the environmental control system includes drawing bleed air from an engine of the aircraft.

6. The method of claim 1, wherein providing the first medium to the environmental control system further comprises drawings in fresh outside air.

7. The method of claim 1, further comprising exhausting the second medium output from the power turbine overboard.

8. The method of claim 1, further comprising exhausting the second medium output from the power turbine into a ram air circuit.

* * * * *